United States Patent
Kawabata (10) Patent No.: US 11,450,187 B2
(45) Date of Patent: Sep. 20, 2022

(54) IMAGE CAPTURING APPARATUS, METHOD OF CONTROLLING IMAGE PROCESSING APPARATUS, RECORDING MEDIUM, AND IMAGE CAPTURING SYSTEM

(71) Applicant: CANON KABUSHIKI KAISHA, Tokyo (JP)

(72) Inventor: Kohsuke Kawabata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/165,243

(22) Filed: Feb. 2, 2021

(65) Prior Publication Data
US 2021/0248886 A1 Aug. 12, 2021

(30) Foreign Application Priority Data
Feb. 6, 2020 (JP) .............................. JP2020-019126

(51) Int. Cl.
| | | |
|---|---|---|
| *H04N 7/18* | (2006.01) | |
| *G08B 13/196* | (2006.01) | |
| *H04N 5/247* | (2006.01) | |
| *H04N 5/232* | (2006.01) | |

(52) U.S. Cl.
CPC ... *G08B 13/19645* (2013.01); *H04N 5/23299* (2018.08); *H04N 5/247* (2013.01)

(58) Field of Classification Search
CPC .. H04N 9/3105; H04N 5/23299; H04N 7/185; H04N 5/247; H04N 2007/145; H04N 5/2258; H04N 5/23296; H04N 5/265; H04N 1/00538; H04N 1/04; G01B 17/02; B64D 23/00; G08B 13/196; G08B 29/20; H01L 21/681; H01L 21/67092
USPC .......................................................... 348/143
See application file for complete search history.

(56) References Cited

U.S. PATENT DOCUMENTS

| | | | |
|---|---|---|---|
| 10,771,693 B2 | 9/2020 | Yamamoto | |
| 2007/0115355 A1* | 5/2007 | McCormack | G08B 29/20 348/143 |
| 2010/0194882 A1* | 8/2010 | Belsarkar | G08B 13/19602 348/143 |
| 2010/0201810 A1* | 8/2010 | Shimazaki | G06T 7/73 348/135 |
| 2016/0381301 A1* | 12/2016 | Shroff | G06T 11/60 348/240.3 |
| 2019/0082105 A1* | 3/2019 | Yamamoto | G06T 7/292 |

FOREIGN PATENT DOCUMENTS

JP 2019054369 A 4/2019

* cited by examiner

*Primary Examiner* — Masum Billah
(74) *Attorney, Agent, or Firm* — Rossi, Kimms & McDowell LLP (57) ABSTRACT

An image capturing apparatus comprises a plurality of movable image capturing units, a detection unit configured to detect positions of the respective image capturing units, and a generation unit configured to generate video data in which videos obtained by the image capturing units are laid out based on a detection result of the detection unit. The generation unit sets a positional relationship in the video data between at least two videos obtained by at least two image capturing units out of the image capturing units to coincide with a positional relationship between the at least two image capturing units.

9 Claims, 8 Drawing Sheets

IMAGE CAPTURING APPARATUS, METHOD OF CONTROLLING IMAGE PROCESSING APPARATUS, RECORDING MEDIUM, AND IMAGE CAPTURING SYSTEM

BACKGROUND OF THE INVENTION

Field of the Invention

The present invention relates to control of a plurality of image capturing apparatuses.

Description of the Related Art

Recently, there is proposed a monitoring camera including a plurality of image capturing units each configured to be movable in one monitoring apparatus. In a monitoring apparatus of this type, a plurality of image capturing units can be configured to shoot separate monitoring areas. In addition, a plurality of image capturing units can be configured to be combined and shoot one continuous area.

There is also proposed a technique of optimizing distribution of shooting information in accordance with the shooting situations of a plurality of cameras. For example, Japanese Patent Laid-Open No. 2019-54369 discloses a technique of changing the distribution order of videos obtained by respective cameras when an overlapping area exists between images captured by a plurality of fixed cameras each having a fixed image capturing range, and images captured by a PTZ camera capable of changing the image capturing range.

In general, a plurality of videos shot by a plurality of image capturing units are displayed in a layout designated in advance on the display screen of a viewer. When a plurality of image capturing units are combined and shoot one continuous area, a problem arises that the single area is divided and displayed. The technique disclosed in the above-mentioned patent literature is to change the distribution order of videos shot by a plurality of cameras and cannot solve this problem.

SUMMARY OF THE INVENTION

According to one aspect of the present invention, an image capturing apparatus comprises: a plurality of movable image capturing units; a detection unit configured to detect positions of the respective image capturing units; and a generation unit configured to generate video data in which videos obtained by the image capturing units are laid out based on a detection result of the detection unit, wherein the generation unit sets a positional relationship in the video data between at least two videos obtained by at least two image capturing units out of the image capturing units to coincide with a positional relationship between the at least two image capturing units.

The present invention enables preferably displaying a plurality of videos shot by a plurality of image capturing units.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image capturing apparatus including three cameras will be exemplified below as the first embodiment of an image capturing apparatus according to the present invention.

<Apparatus Arrangement>

Figure 1:
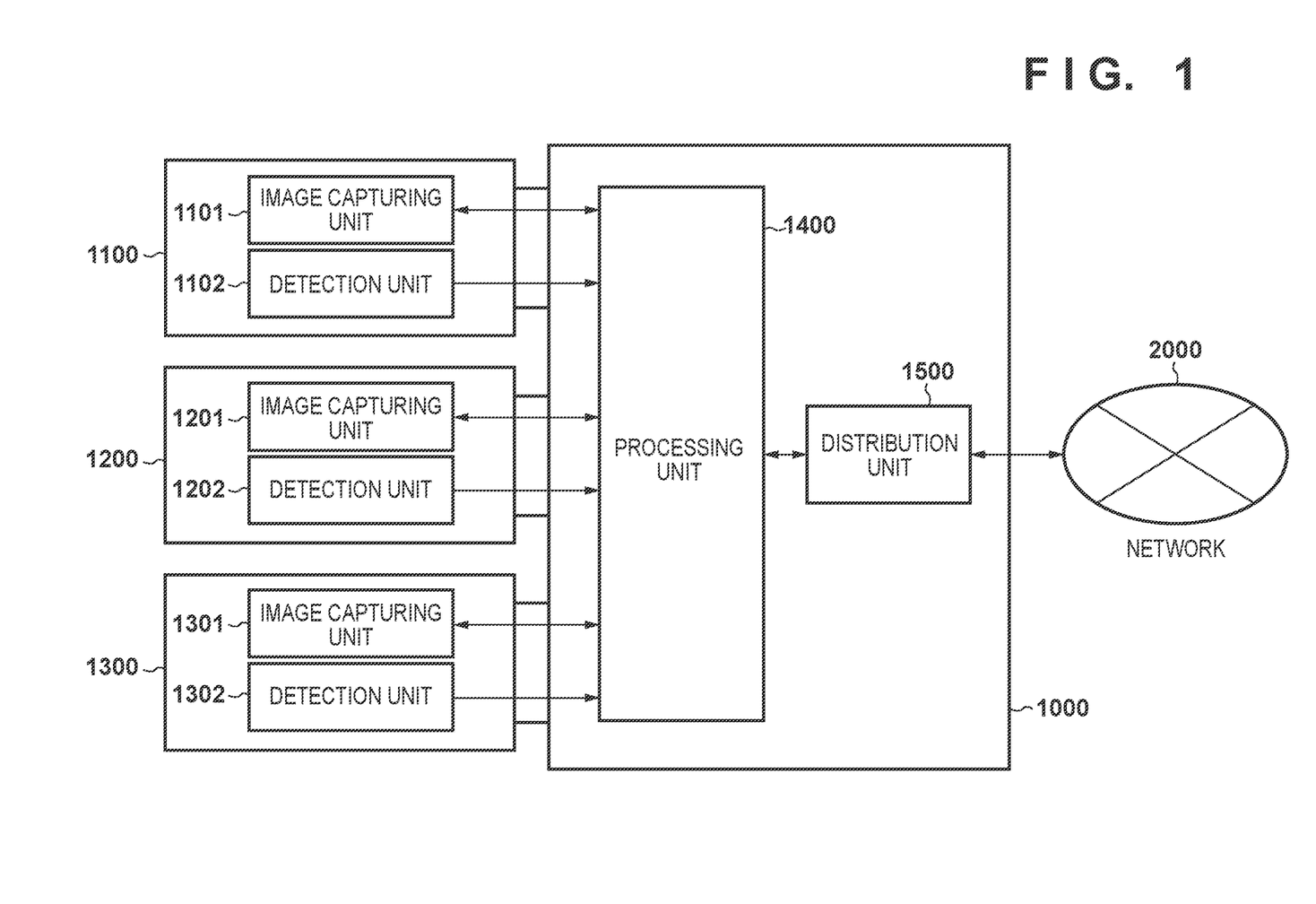
FIG. 1 is a block diagram showing the functional arrangement of an image capturing apparatus including three cameras.
Figure 2A:
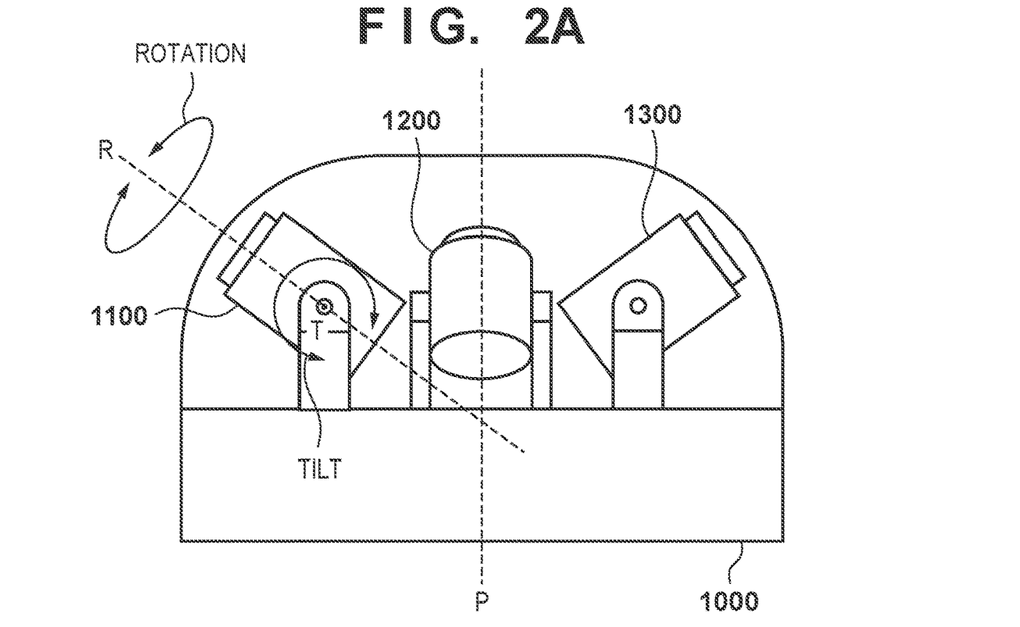
FIGS. 2A and 2B are views for explaining three types of rotating operations that define a shooting range.
Figure 2B:
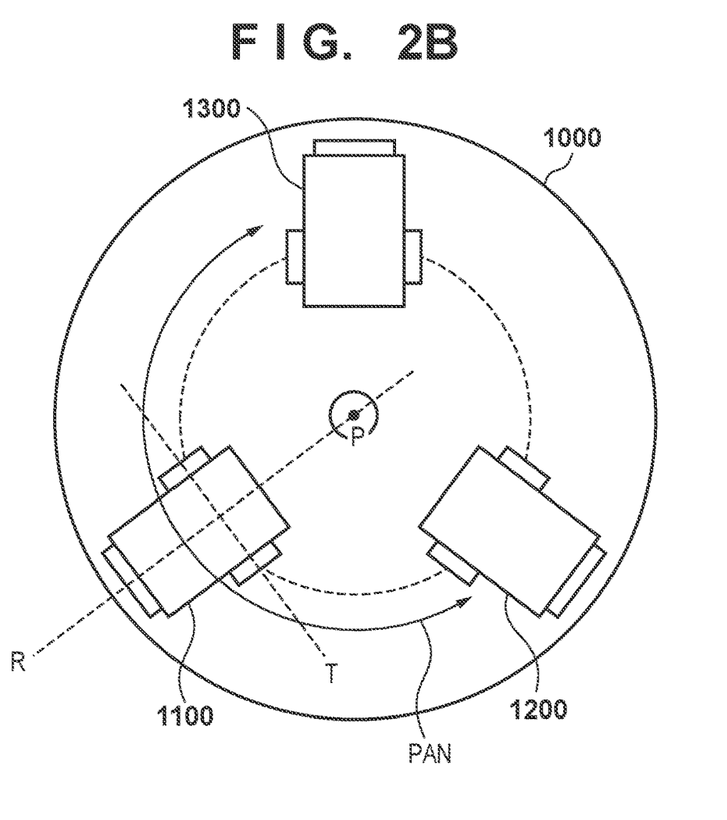

FIG. 1 is a block diagram showing the functional arrangement of an image capturing apparatus including three cameras. Note that this arrangement is merely an example, and the present invention is not limited to the arrangement shown in FIG. 1. FIGS. 2A and 2B are views for explaining three types of rotating operations that define a shooting range.

An image capturing apparatus 1000 includes cameras 1100, 1200, 1300, a processing unit 1400, and a distribution unit 1500. As shown in FIGS. 2A and 2B, the three cameras (cameras 1100, 1200, and 1300) are stored in the housing of the image capturing apparatus 1000, and are configured to perform rotating operations, that is, pan (P), tilt (T), and rotation (R). In the following description, attention is paid to the camera 1100 on the assumption that the cameras 1200 and 1300 have the same arrangement as that of the camera 1100.

FIG. 2A shows a state in which the image capturing apparatus 1000 is viewed in the lateral (horizontal) direction. FIG. 2B shows a state in which the image capturing apparatus 1000 is viewed from the top in the vertical direction. As shown in FIGS. 2A and 2B, the shooting direction of the camera 1100 can be changed by changing the pan, tilt, and rotation angles. The pan, tilt, and rotation angles are changed by rotating operations about axes P, T, and R.

The pan angle can be changed by changing an angle up to an adjacent camera. For example, when the cameras 1100, 1200, and 1300 are laid out as shown in FIG. 2B, the pan angle of the camera 1100 can be changed within a rotation range (arrow) from the camera 1200 to the camera 1300 about the axis P. As for the cameras 1200 and 1300, the pan, tilt, and rotation angles of each camera can be changed similar to the camera 1100.

The camera 1100 includes an image capturing unit 1101 and a detection unit 1102. The image capturing unit 1101 is formed from a lens and an image sensor such as a CCD or CMOS sensor, and is configured to output an electrical signal obtained by image capturing to the processing unit 1400. The detection unit 1102 is formed from a rotary encoder, a photointerrupter, an angular velocity sensor, and the like, and is configured to output information about the pan, tilt, and rotation angles of the camera 1100 to the processing unit 1400.

The processing unit 1400 receives electrical signals output from the image capturing unit 1101 and image capturing units 1201 and 1301, performs predetermined image processing and compression encoding processing, and generates video data. The generated video data is, for example, a single video stream in which videos from the three cameras are laid out at predetermined positions. The layout of videos from the three cameras will be described later. The processing unit 1400 outputs the generated video data to the distribution unit 1500.

The processing unit 1400 transmits the set values of shooting conditions to the image capturing units 1101, 1201, and 1301, and changes the driving states of the respective image capturing units. The shooting conditions include the gain condition, gamma condition, dynamic range condition, exposure condition, focus condition, and the like.

In addition, the processing unit 1400 receives angle information of the respective cameras output from the detection unit 1102 and detection units 1202 and 1302, and detects the shooting ranges of the respective cameras.

The distribution unit 1500 is connected to a network 2000, and distributes video data output from the processing unit 1400 to the network 2000. The user can view the videos from the three cameras via a viewer (not shown) connected to the network 2000. The distribution unit 1500 transmits to the processing unit 1400 information (various kinds of setting information and the like) received via the network 2000.

<Operation of Apparatus>

Layout control of videos from the three cameras when the processing unit 1400 generates video data will be described below.

Figure 3:
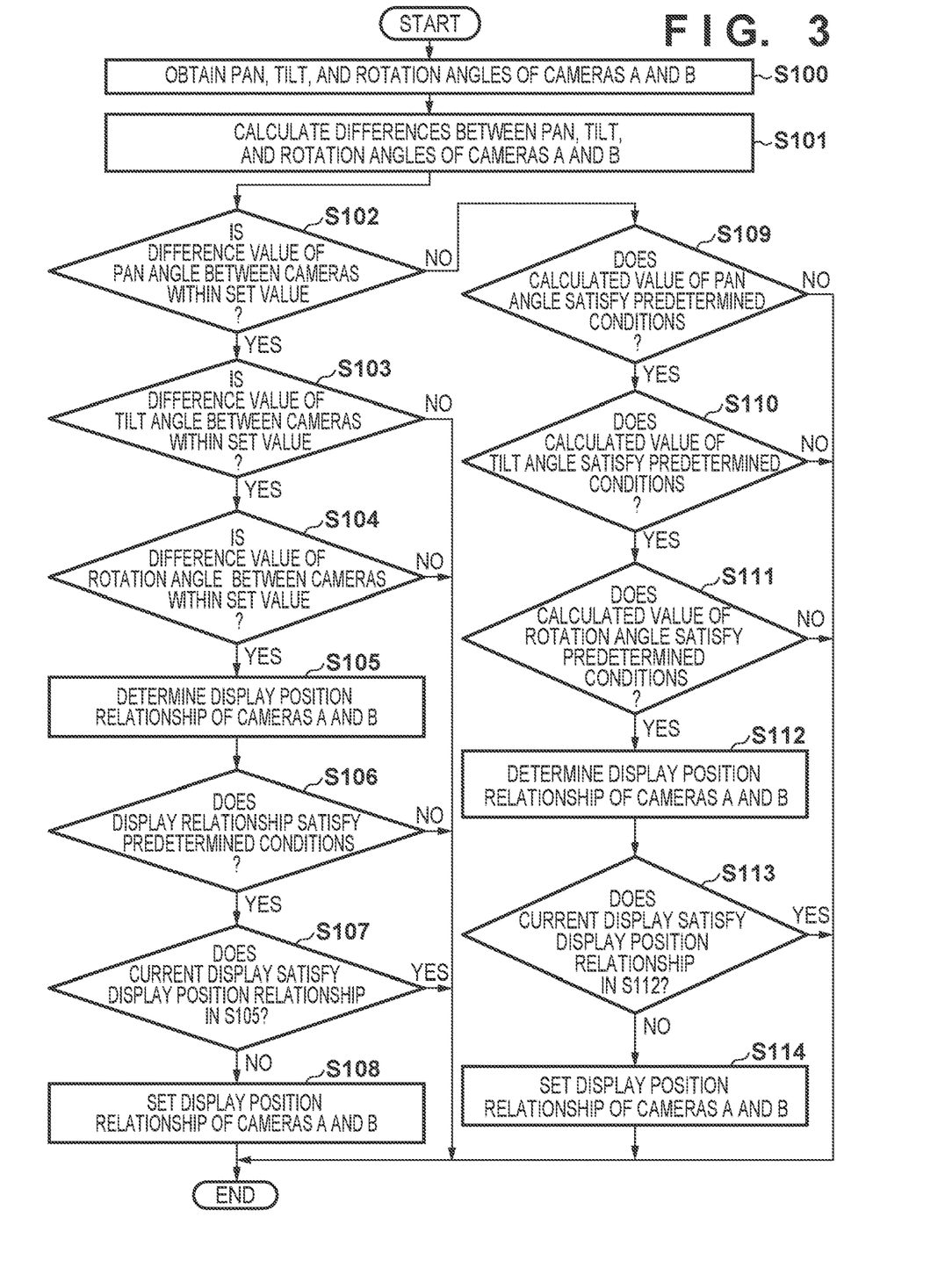
FIG. 3 is a flowchart for explaining control of the display positions of two videos by two cameras.

Here, processing in FIG. 3 is assumed to be implemented by executing a predetermined control program by a CPU included in the processing unit 1400. The control program is assumed to be stored in a nonvolatile memory or the like included in the processing unit 1400. The processing unit 1400 may be formed from hardware such as an application specific IC (ASIC). Various angle values to be described later (for example, Xh, Xv, Xr, Yh, Yv, Mh1, Mh2, and Nv to be described later) are assumed to be stored in advance in the nonvolatile memory (not shown) or the like. These angle values are assumed to be set automatically or manually in accordance with the installation situation and shooting target of the camera.

FIG. 3 is a flowchart for explaining control of the display positions (layout) of two videos by two cameras. In this sequence, an operation is performed on two arbitrary cameras out of the cameras 1100, 1200, and 1300. More specifically, control of the display positions (layout) is performed by determining whether two cameras shoot almost the same area (one continuous area) or areas independent of each other. Two cameras selected from the cameras 1100, 1200, and 1300 will be described as cameras A and B, respectively.

First, a sequence excluding a specific case (steps S109 to S114) to be described later will be explained.

In step S100, the processing unit 1400 obtains the pan, tilt, and rotation angles of the cameras A and B. The pan, tilt, and rotation angles of the camera A will be referred to as Ah, Av, and Ar, respectively. The pan, tilt, and rotation angles of the camera B will be referred to as Bh, Bv, and Br, respectively.

In step S101, the processing unit 1400 calculates differences between the pan, tilt, and rotation angles of the cameras A and B. The respective differences will be referred to as ΔABh, ΔABv, and ΔABr.

Figure 4A:
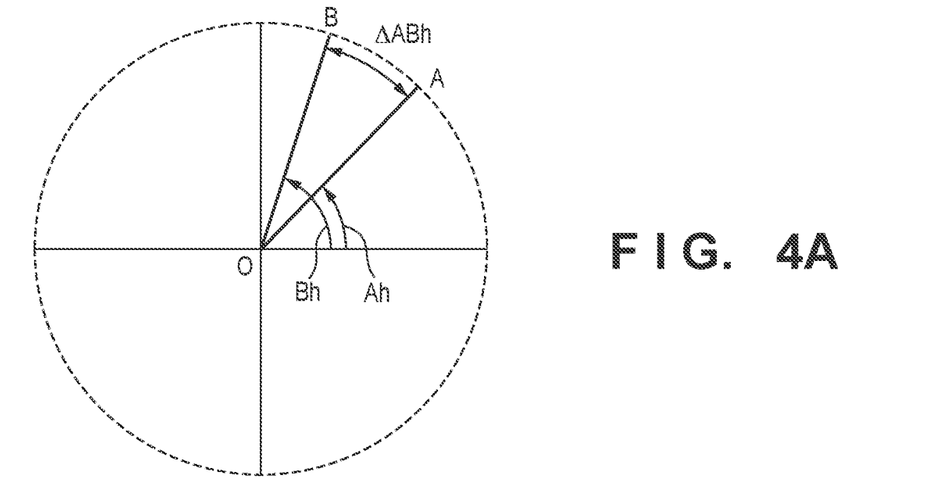
FIGS. 4A to 4C are views for explaining three types of angles in each of the two cameras.
Figure 4B:
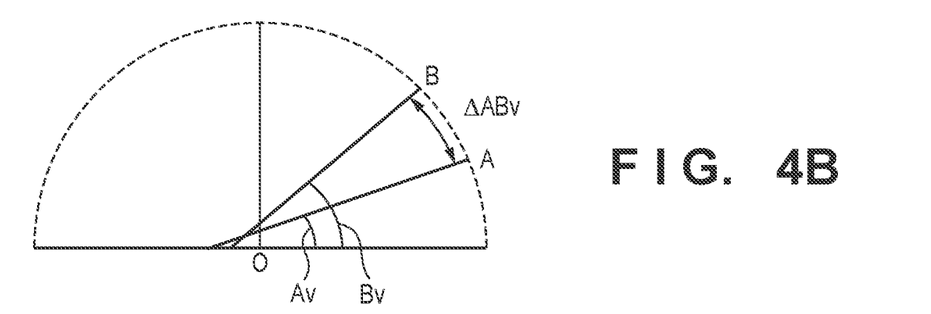
Figure 4C:
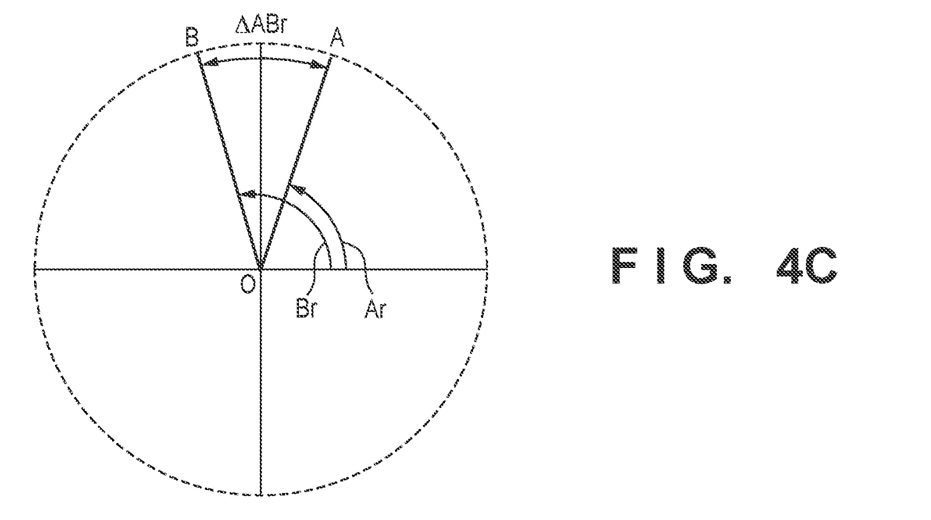

FIGS. 4A to 4C are views for explaining three types of angles and differences in the two cameras. FIG. 4A shows a horizontal section and shows the relationship between Ah, Bh, and ΔABh. FIG. 4B shows a vertical section and shows the relationship between Av, Bv, and ΔABv. Because of the camera arrangement as shown in FIG. 2A, straight lines that pass through the cameras A and B and define the angles Av and Bv do not always pass through an origin O. FIG. 4C shows a section perpendicular to the optical axis and shows the relationship between Ar, Br, and ΔABr. Note that the difference values ΔABh, ΔABv, and ΔABr are calculated by equations (1) to (3):

$$\Delta ABh = Ah - Bh \quad (1)$$

$$\Delta ABv = Av - Bv \quad (2)$$

$$\Delta ABr = Ar - Br \quad (3)$$

In step S102 the processing unit 1400 compares an absolute value |ΔABh| of ΔABh with a preset angle Xh. If |ΔABh|≤Xh, it is determined that the cameras A and B are close in the pan direction, in other words, the angle in the pan direction is small, and the process advances to step S103. If |ΔABh|>Xh, the process advances to step S109.

In step S103, the processing unit 1400 compares an absolute value |ΔABv| of ΔABv with a preset angle Xv. If |ΔABv|≤Xv, it is determined that the cameras A and B are close in the tilt direction, in other words, the angle in the tilt direction is small, and the process advances to step S104. If |ΔABv|>Xv, it is determined that the cameras A and B shoot independent shooting ranges, and the process ends.

In step S104, the processing unit 1400 compares an absolute value |ΔABr| of ΔABr with a preset angle Xr. If |ΔABr|≤Xr, it is determined that the cameras A and B are close in the rotation direction, in other words, the angle in the rotation direction is small, and the process advances to step S105. If |ΔABr|>Xr, it is determined that the cameras A and B shoot independent shooting ranges, and the process ends. That is, if it is determined in steps S102 to S104 that the shooting ranges of the cameras A and B fall within a predetermined angle range, the process advances to step S105.

In step S105, the processing unit 1400 determines the relationship in display position between the cameras A and B, that is, the positional relationship between the shooting ranges of the cameras A and B.

Figure 5:
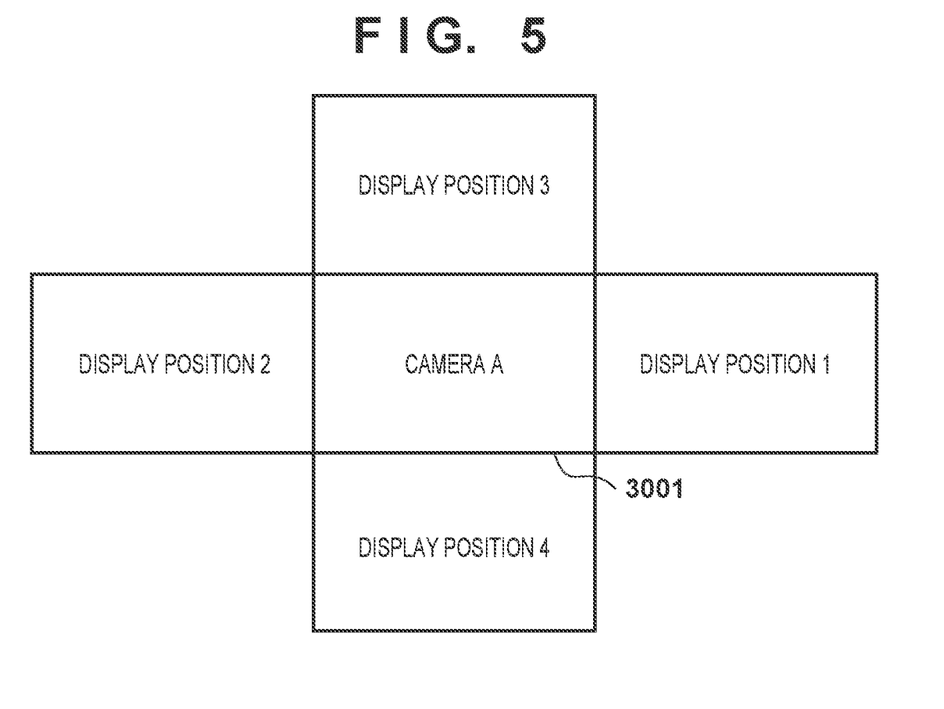
FIG. 5 is a view for explaining the display position of the video of a camera B with respect to the video of a camera A.

FIG. 5 is a view for explaining the display position of the video of the camera B with respect to the video of the camera A. FIG. 5 shows display positions (display positions 1 to 4) for the video of the camera B with reference to a display position 3001 of the video of the camera A. One of the four display positions that corresponds to the video of the camera B is decided based on the following conditions (i) to (v):

(i) condition that the display position of the video of the camera B is determined to be display position 1:

$$0 \leq \Delta ABh \leq Xh \text{ and } -Yv < \Delta ABv < Yv \quad (4)$$

(ii) condition that the display position of the video of the camera B is determined to be display position 2:

$$-Xh \leq \Delta ABh < 0 \text{ and } -Yv < \Delta ABv < Yv \quad (5)$$

(iii) condition that the display position of the video of the camera B is determined to be display position 3:

$$-Yh < \Delta ABh < Yh \text{ and } 0 \leq \Delta ABv \leq Xv \quad (6)$$

(iv) condition that the display position of the video of the camera B is determined to be display position 4:

$$-Yh < \Delta ABh < Yh \text{ and } Xv \leq \Delta ABv < 0 \quad (7)$$

(v) if none of the above conditions is satisfied, the setting of the display position is not changed.

Note that the above-described display position candidates and condition settings are merely an example and can also be changed in accordance with the number of cameras and the display form.

In step S106, the processing unit 1400 determines whether one of the predetermined conditions (conditions (i) to (iv) described above) is satisfied in step S105. If one of the predetermined conditions is satisfied, the process advances to step S107. If none of the predetermined condition is satisfied (that is, condition (v) described above), the process ends.

In step S107, the processing unit 1400 determines whether the current relationship between the display positions of the cameras A and B (positional relationship between the videos of the cameras A and B in video data generated by the processing unit 1400) coincides with the relationship in display position determined in step S105. If these relationships coincide with each other, no setting need be changed and the process ends. If these relationships do not coincide with each other, the process advances to step S108.

In step S108, the processing unit 1400 sets the display positions of the cameras A and B to have the positional relationship (detection result) determined in step S105. That is, the processing unit 1400 sets the positional relationship between the videos of the cameras A and B in video data generated by the processing unit 1400 so as to coincide with the positional relationship between the shooting ranges of the cameras A and B. The set video data is transmitted to an external apparatus via the network. After that, the process ends.

Figure 6:
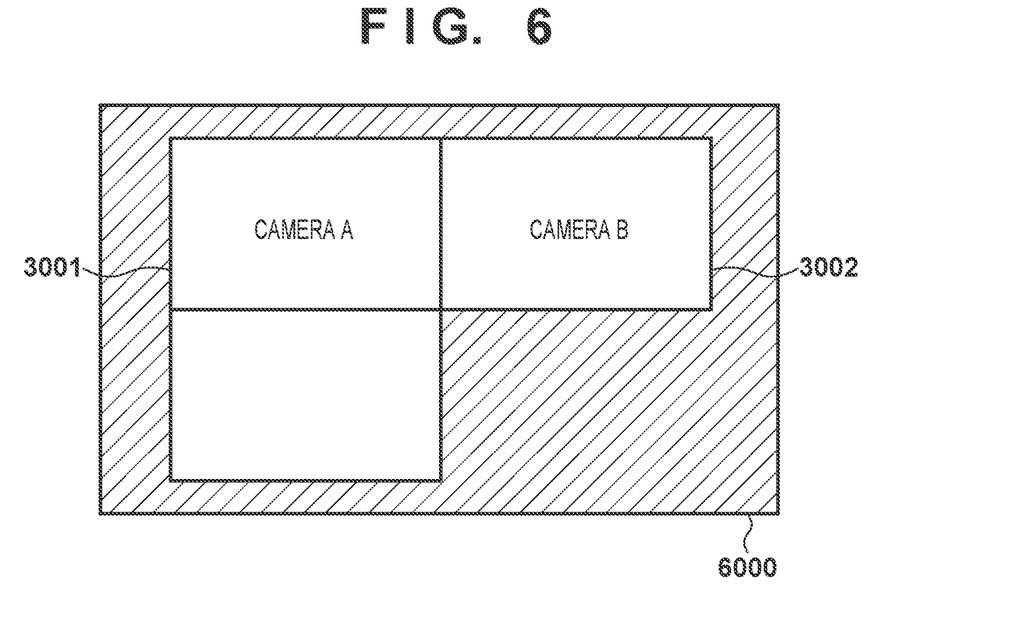
FIG. 6 is a view showing an example of display on the display screen of a viewer.

FIG. 6 is a view showing an example of display on a display screen 6000 of the viewer. As an example of the display, a case will be considered in which the videos of the cameras A and B are displayed in two display frames out of three preset display frames as shown in FIG. 6.

Assume that the display position of the video of the camera B is determined to be "display position 1" with reference to the display position of the video of the camera A. In this case, the relationship between the display positions of the videos of the cameras A and B is the relationship between the display position 3001 and a display position 3002 in FIG. 6. A case in which three display frames are set in advance has been described, but a similar setting can be applied to even a case in which there are more than three display frames. More specifically, display positions are so set as to hold the positional relationship between the videos of the cameras A and B determined in step S105.

Next, a case in which the process advances to step S109 will be described. That is, a case in which it is determined in step S102 that $|\Delta ABh| > Xh$ will be explained. In this case, a situation in which the two cameras have shooting ranges (shooting directions) as shown in FIGS. 7A and 7B needs to be considered.

Figure 7A:
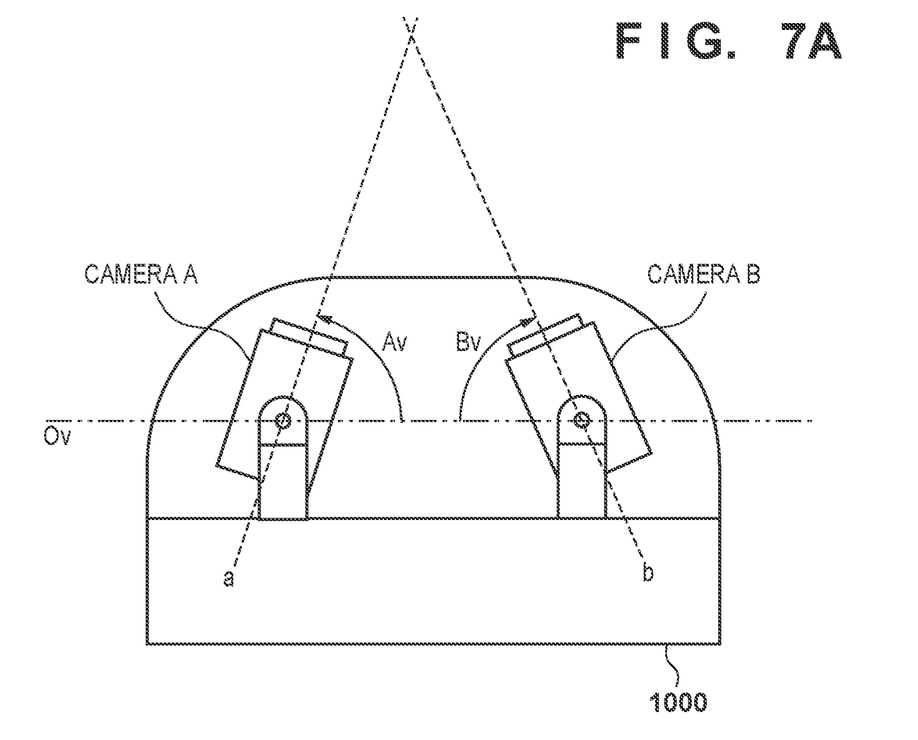
FIGS. 7A and 7B are views for explaining a state in which the two cameras shoot almost the same area.
Figure 7B:
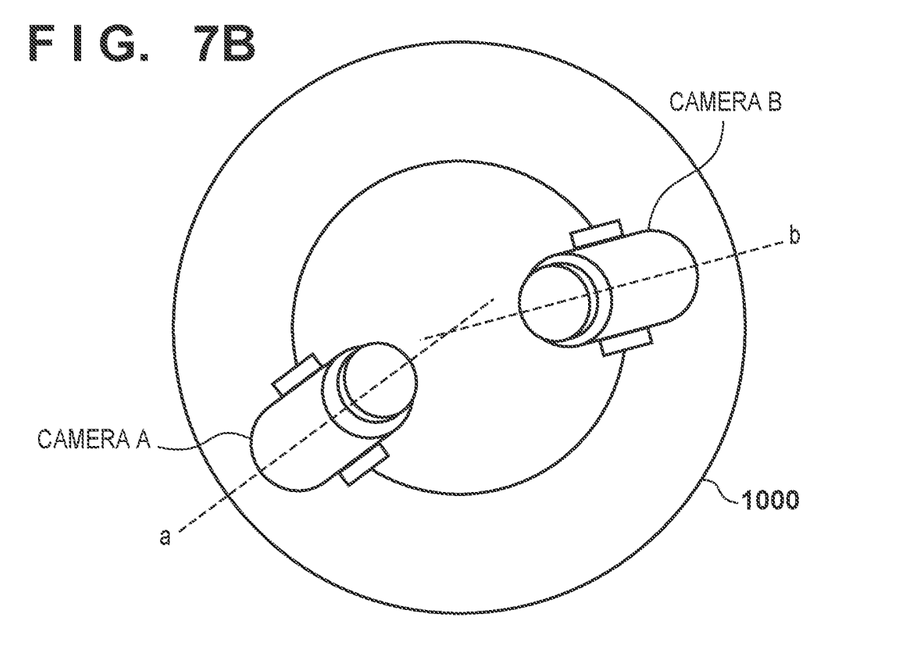

FIGS. 7A and 7B are views for explaining a state in which the two cameras shoot almost the same area. This is equivalent to a situation in which the two cameras shoot almost the same area (one continuous area) at different pan angles.

In FIGS. 7A and 7B, the optical axis of shooting of the camera A is an axis a, and that of shooting of the camera B is an axis b. The cameras A and B shoot almost the same area at different pan angles. An angle defined by a plane Ov and the axis a is called an angle Av, and an angle defined by the plane Ov and the axis b is called an angle Bv.

In step S109, the processing unit 1400 compares the absolute value $|\Delta ABh|$ of $\Delta ABh$ with the preset angles Mh1 and Mh2 (Mh1<Mh2) in regard to the pan angle:

$$Mh1 \leq |\Delta ABh| \leq Mh2 \quad (8)$$

If inequality (8) is satisfied, the process advances to step S110; otherwise, the process ends.

In step S110, the processing unit 1400 determines whether inequality (9) is satisfied in regard to the tilt angle:

$$0 < Av < 180° \text{ and } 0 < Bv < 180° \text{ and } |\Delta ABh| \leq Nv \quad (9)$$

where $|\Delta ABh|$ is the absolute value of $\Delta ABh$. If inequality (9) is satisfied, it is determined that the angles of the cameras A and B in the tilt direction are close, and the process advances to step S111; otherwise, the process ends.

In step S111, the processing unit 1400 compares the absolute value $|\Delta ABr|$ of $\Delta ABr$ with a preset angle Xr in regard to the rotation angle:

$$-Xr \leq |Ar| - |Br| \leq Xr \quad (10)$$

If inequality (10) is satisfied, the process advances to step S112; otherwise, the process ends.

In step S112, the processing unit 1400 determines the display relationship of the camera B with respect to the camera A. That is, the processing unit 1400 determines the positional relationship between the shooting ranges of the cameras A and B.

Figure 8:
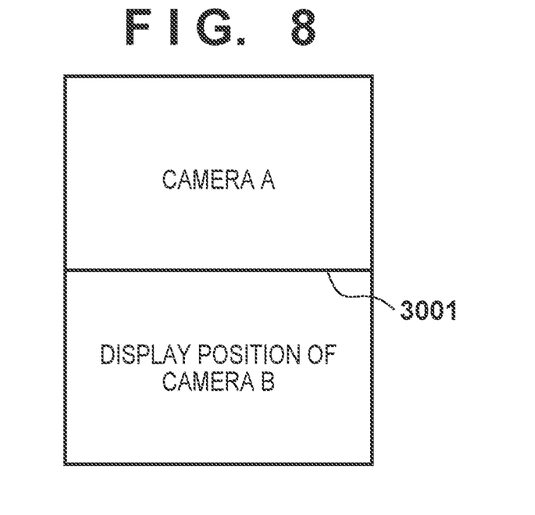
FIG. 8 is a view for explaining the display position of the video of the camera B with respect to the video of the camera A.

FIG. 8 is a view for explaining the display position of the video of the camera B with respect to the video of the camera A. FIG. 8 shows one display position of the video of the camera B with reference to the display position of the video of the camera A. Whether to rotate by 180° the video of the camera B at this display position is determined based on the following conditions (vi) and (vii). This is because the videos of the cameras may be rotated by 180° in the layout of the two cameras shown in FIG. 7B.

(vi) condition that the video of the camera B is displayed without rotation (0° rotation):

$$0° \leq \Delta ABr \leq 180° \quad (11)$$

(vii) condition that the video of the camera B is rotated by 180° and displayed:

$$-180° \leq \Delta ABr < 0° \quad (12)$$

In step S113, the processing unit 1400 determines whether the current relationship between the display positions of the cameras A and B (positional relationship between the videos of the cameras A and B in video data generated by the processing unit 1400) coincides with the relationship in display position determined in step S112. If these relationships coincide with each other, no setting need be changed and the process ends. If these relationships do not coincide with each other, the process advances to step S114.

In step S114, the processing unit 1400 sets the display positions of the cameras A and B to have the positional relationship determined in step S112. That is, the processing unit 1400 sets the positional relationship between the videos of the cameras A and B in video data generated by the processing unit 1400 so as to coincide with the positional relationship between the shooting ranges of the cameras A and B. The set video data is transmitted to an external apparatus via the network. Then, the process ends.

The above-described sequence is performed sequentially for two of the three cameras, and video data can be generated in which the relationship in display position becomes proper on the display screen 6000 of the viewer. Although two cameras have been described above, the determination and setting of the positional relationship may be performed for a larger number of cameras.

As described above, according to the first embodiment, the positional relationship between the shooting ranges of respective cameras is determined. Then, the videos of two cameras shooting almost the same area (one continuous area) are set to have the same positional relationship in video data generated by the processing unit 1400. This arrangement can prevent divided display of the videos of two cameras shooting almost the same area on the display screen of the viewer.

An example in which the image capturing apparatus 1000 incorporates the function of generating and distributing video data including a plurality of camera videos has been described above. However, a capturing system may be configured in which this function is arranged in a server apparatus (not shown) separated from the image capturing apparatus 1000. More specifically, the cameras 1100 to 1300, the processing unit 1400, and the distribution unit 1500 may be distributed and arranged on the network in FIG. 1.

(Modification)

An example in which the videos of two cameras shooting almost the same area are adjacent to each other in the image capturing apparatus including three cameras has been described in the first embodiment. However, when the image capturing apparatus includes a larger number of cameras, there may be a plurality of pairs of cameras having the positional relationship in which videos are adjacent to each other. In this case, display positions are determined so that the videos of the paired cameras are adjacent to each other in video data.

Although a camera capable of changing the pan, tilt, and rotation angles has been described in the first embodiment, a camera capable of changing only the pan angle may be adopted. In this case, it is determined whether two cameras are close in the pan direction. That is, the processes regarding the tilt and rotation angles are not performed in the processing of FIG. 3.

Similarly, a camera capable of changing the pan and tilt angles may be adopted. In this case, it is determined whether two cameras are close in the pan direction and are close in the tilt direction. That is, the process regarding the rotation angle is not performed in the processing of FIG. 3.

Also, a camera capable of changing only the tilt angle may be adopted. In this case, it is determined whether two cameras are close in the tilt direction. That is, the processes regarding the pan and rotation angles are not performed in the processing of FIG. 3.

Figure 9A:
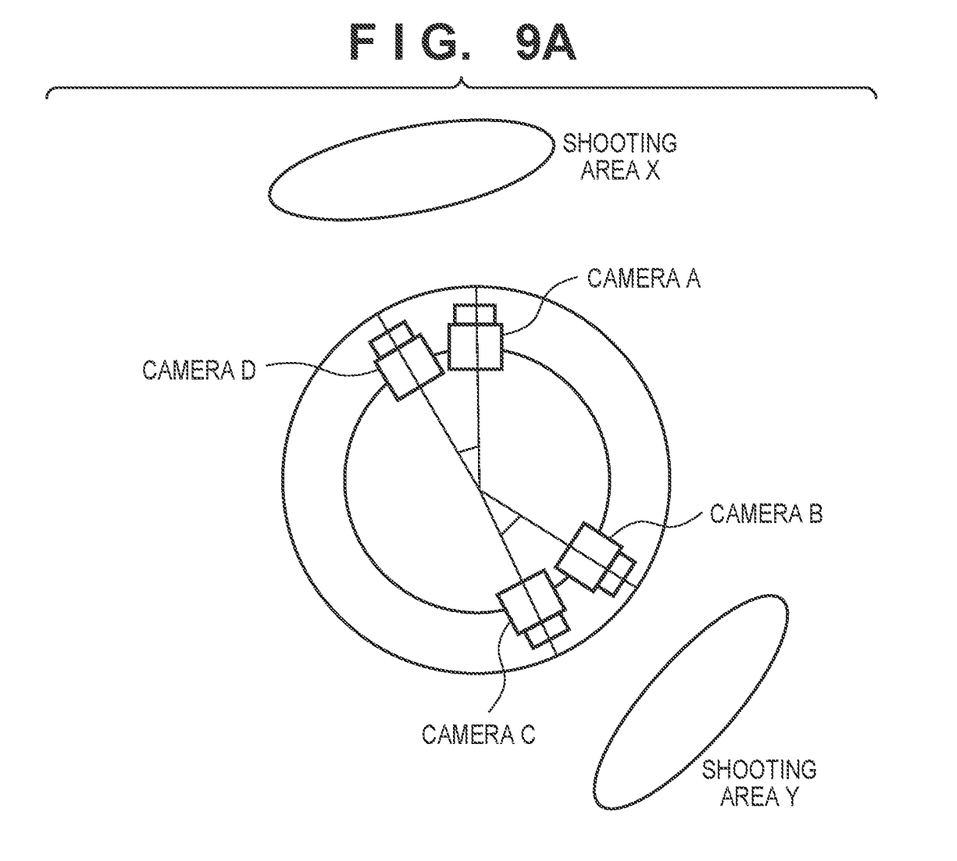
FIGS. 9A to 9C are views showing an example of display of four videos by four cameras.
Figure 9B:
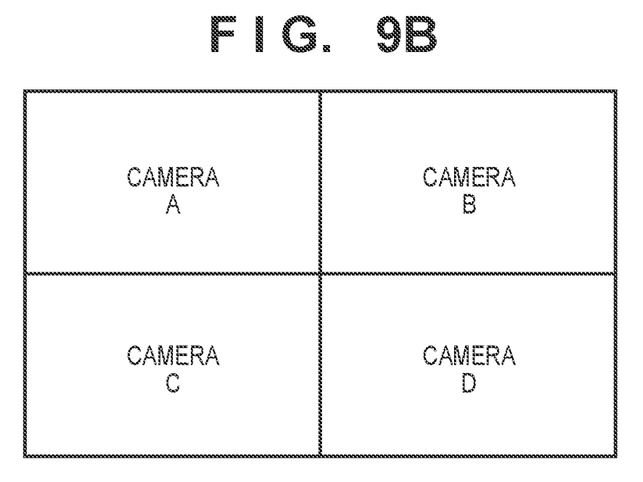
Figure 9C:
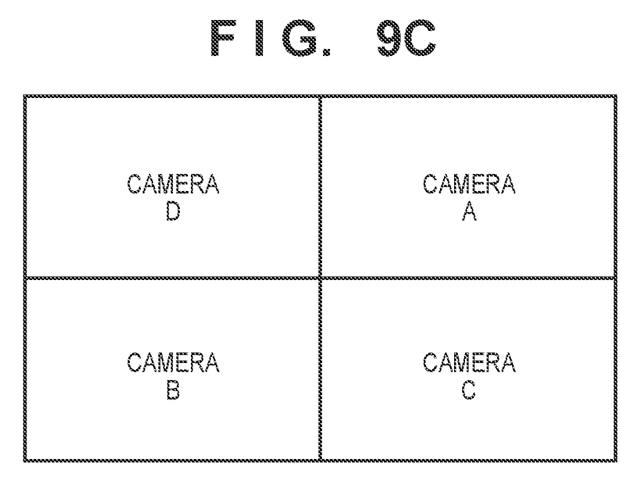

FIGS. 9A to 9C are views showing an example of display of four videos by four cameras. FIG. 9A shows the state of an image capturing apparatus including the four cameras when viewed from the top in the vertical direction. Here, cameras A and D shoot one continuous area (shooting area X). Cameras B and C shoot another continuous area (shooting area Y).

FIG. 9B shows the initial layout setting of four camera videos in video data generated by the processing unit 1400. When video data is generated at this initial layout setting, videos corresponding to the shooting areas X and Y are divided and displayed on the display screen of the viewer.

FIG. 9C shows a changed layout setting of the four camera videos. More specifically, the video of the camera D is determined to be at "display position 2" in FIG. 5 with respect to the video of the camera A. As a result, the videos of the cameras D and A corresponding to the shooting area X are laid out to be laterally adjacent to each other in the video data. Also, the video of the camera C is determined to be at "display position 1" in FIG. 5 with respect to the video of the camera B. As a result, the videos of the cameras B and C corresponding to the shooting area Y are laid out to be laterally adjacent to each other in the video data. The videos of the two cameras shooting the shooting area X, and those of the two cameras shooting the shooting area Y are displayed on the display screen of the viewer without division.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-019126, filed Feb. 6, 2020, which is hereby incorporated by reference herein in its entirety.

What is claimed is:

1. An image capturing apparatus comprising:
a first image capturing unit configured to be movable and capture a first image;
a second image capturing unit configured to be movable and capture a second image;
a third image capturing unit configured to be movable and capture a third image;
a hardware processor; and
a memory for storing instructions to be executed by the hardware processor, wherein, when the instructions stored in the memory are executed by the hardware processor, the image capturing apparatus functions as:
a detection unit configured to detect positions of the first, second and third image capturing units; and
a generation unit configured to generate image data in which the first, second and third images are laid out based on a detection result of the detection unit,
wherein the generation unit generates the image data in which the first image acquired by the first image capturing unit and the second image acquired by the second image capturing unit are arranged in a first line so as to be adjacent to each other, and the third image acquired by the third image capturing unit is arranged in a second line different from the first line, in a case that the first image capturing unit and the second image capturing unit are arranged to image a continuous region, and the third image capturing unit is arranged to image an independent region not continuous with the imaging regions of the first and second image capturing units, and
wherein the generation unit sets an arrangement of the first and second images in the image data to coincide with a positional relationship between the first and second image capturing units.

2. The apparatus according to claim 1, wherein the first, second and third image capturing units are configured to change the positions by controlling the pan, tilt, and rotation angles of the respective image capturing units, and
the detection unit detects the positions of the respective image capturing units by obtaining the pan, tilt, and rotation angles of the respective image capturing units.

3. The apparatus according to claim 1, wherein, when the instructions stored in the memory are executed by the hardware processor, the image capturing apparatus further function as a distribution unit configured to distribute via a network the image data generated by the generation unit.

4. The apparatus according to claim 1, wherein the detection unit determines that the first imaging unit and the second imaging unit are arranged to image the continuous region, by detecting that the positions of the first and second capturing units fall within a predetermined angle range.

5. The apparatus according to claim 1, wherein if positions of the first and second capturing units satisfy a predetermined positional relationship, the generation unit generates image data in which at least one image out of the at least two images is rotated by 180° in a layout.

6. A method of controlling an image processing apparatus that processes images obtained by a first, second and third image capturing units, wherein
the first image capturing unit is configured to be movable and capture a first image;
the second image capturing unit is configured to be movable and capture a second image; and
the third image capturing unit is configured to be movable and capture a third image, the method comprising:
detecting positions of the first, second and third respective image capturing units; and
generating image data in which the first, second and third images are laid out based on a detection result in the detecting,
wherein, the generating generates the image data in which the first image acquired by the first image capturing unit and the second image acquired by the second image capturing unit are arranged in a first line so as to be adjacent to each other, and the third image acquired by the third image capturing unit is arranged in a second line different from the first line, in a case that the first image capturing unit and the second image capturing unit are arranged to image a continuous region, and the third image capturing unit is arranged to image an independent region not continuous with the imaging regions of the first and second image capturing units, and
wherein, in the generating, an arrangement of the first and second images in the image data is set to coincide with a positional relationship between the first and second image capturing units.

7. A non-transitory computer-readable recording medium storing a program for causing a computer to execute a method of controlling an image processing apparatus that processes images videos obtained by a first, second and third image capturing units, wherein
the first image capturing unit is configured to be movable and capture a first image;
the second image capturing unit is configured to be movable and capture a second image; and
the third image capturing unit is configured to be movable and capture a third image,
the method comprising:
detecting positions of the first, second and third image capturing units; and
generating image data in which the first, second and third images are laid out based on a detection result in the detecting,
wherein, the generating generates the image data in which the first image acquired by the first image capturing unit and the second image acquired by the second image capturing unit are arranged in a first line so as to be adjacent to each other, and the third image acquired by the third image capturing unit is arranged in a second line different from the first line, in a case that the first image capturing unit and the second image capturing unit are arranged to image a continuous region, and the third image capturing unit is arranged to image an independent region not continuous with the imaging regions of the first and second image capturing units, and
wherein, in the generating, an arrangement of the first and second images in the image data is set to coincide with a positional relationship between the first and second image capturing units.

8. An image capturing system comprising:
a first image capturing apparatus configured to be movable and capture a first image;
a second image capturing apparatus configured to be movable and capture a second image;
a third image capturing apparatus configured to be movable and capture a third image;

a server apparatus configured to generate image data based on images obtained by the first, second and third image capturing apparatuses and distribute the image data, wherein the server apparatus comprises:

a hardware processor; and a memory for storing instructions to be executed by the hardware processor, wherein, when the instructions stored in the memory are executed by the hardware processor, the server apparatus functions as:

a detection unit configured to detect positions of the first, second and third image capturing apparatuses; and a generation unit configured to generate image data in which the first, second and third images are laid out based on a detection result of the detection unit, and wherein the generation unit generates the image data in which the first image acquired by the first image capturing apparatus and the second image acquired by the second image capturing apparatus are arranged in a first line so as to be adjacent to each other, and the third image acquired by the third image capturing apparatus is arranged in a second line different from the first line, in a case that the first image capturing apparatus and the second image capturing apparatus are arranged to image a continuous region, and the third image capturing apparatus is arranged to image an independent region not continuous with the imaging regions of the first and second image capturing apparatuses, and wherein the generation unit sets an arrangement of the first and second images in the image data to coincide with a positional relationship between the first and second image capturing apparatuses.

9. The apparatus according to claim 1, further comprising;

a fourth image capturing unit is configured to be movable and capture a fourth image, wherein the generation unit generates the image data in which the first image acquired by the first image capturing unit and the second image acquired by the second image capturing unit are arranged in the first line so as to be adjacent to each other, and the third image acquired by the third image capturing unit and the fourth image acquired by the fourth image capturing unit are arranged in the second line different from the first line so as to be adjacent to each other, in a case that the first image capturing unit and the second image capturing unit are arranged to image a first continuous region, and the third image capturing unit and the fourth image capturing unit are arranged to image a second continuous region different from the first continuous region, wherein the generation unit sets an arrangement of the third and fourth images in the image data to coincide with a positional relationship between the third and fourth image capturing units.

* * * * *